(No Model.)
A. VIVARTTAS.
BEVEL GEAR.
No. 274,862. Patented Mar. 27, 1883.
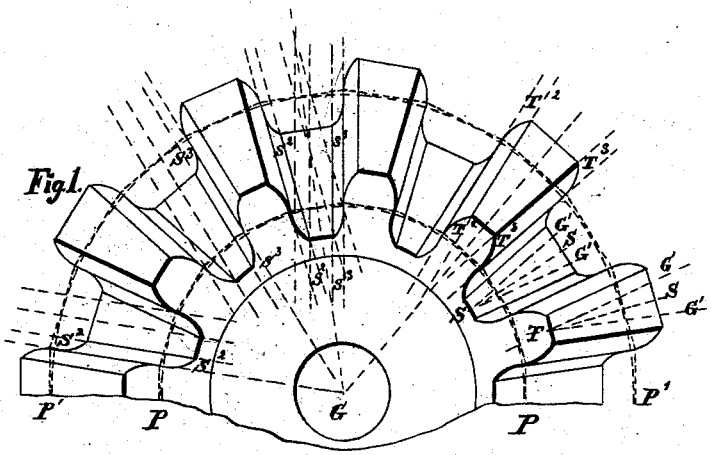
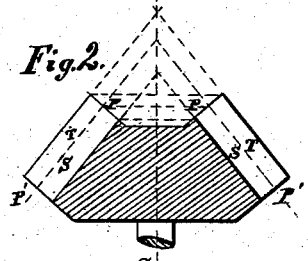 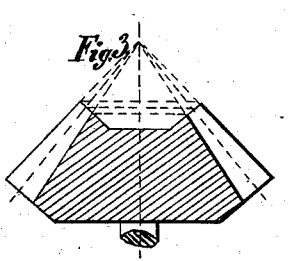
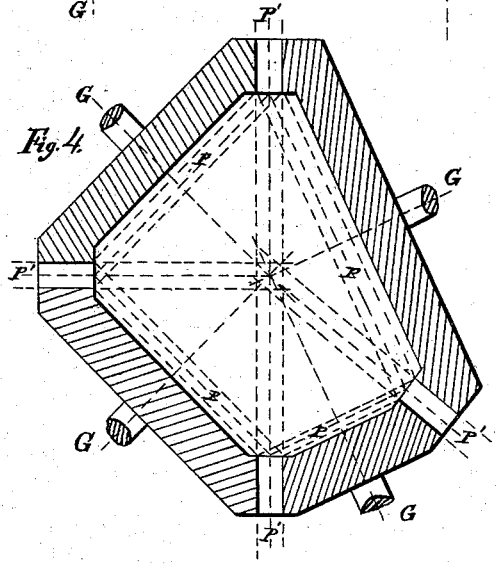
Witnesses
Edward Hughes
Augustus Bettyre
Inventor
Aloha Vivarttas
N. PETERS, Photo-Lithographer, Washington, D. C.

UNITED STATES PATENT OFFICE.

ALOHA VIVARTTAS, OF WEST HOBOKEN, NEW JERSEY.

BEVEL-GEAR.

SPECIFICATION forming part of Letters Patent No. 274,862, dated March 27, 1883.

Application filed August 19, 1882. (No model.)

*To all whom it may concern:*

Be it known that I, ALOHA VIVARTTAS, of West Hoboken, New Jersey, have invented Improvements in Bevel-Gear, of which the following is a specification.

Of the drawings, Figure 1 is a plan view of a part of a bevel-gear. Fig. 2 is a cross-section of a bevel-gear as improved. Fig. 3 is a cross-section of a bevel-gear without improvement. Fig. 4 is a cross-section of four bevel-gears of improved pattern, showing how gears of various sizes or numbers of teeth will interchange and run together.

This invention relates to the form and method of laying out and constructing or finishing the teeth of gear-wheels whose shafts are not parallel, such as are commonly called "bevels," "miters," and others.

In laying out these gear it has generally been considered necessary to treat the tooth of the gear as primarily conoidal, tapering in all of its proportions toward the point where the shaft-centers would intersect if produced, as shown in Fig. 3. This kind of gear is both difficult and expensive to cut with precision, and is generally very imperfectly fitted, requiring massive proportions, because the strains are not properly met nor distributed, and is, on account of its various imperfections, avoided as much as practicable by the best mechanics; but gear for such purposes may be made as easily and perfectly as spur-gear of the same pitch, and will run as truly and smoothly in every respect. For this purpose the tooth is treated, not as a conoid, but as a wedge, the flanks retaining their dimensions and curves unchanged, and the top or face of the tooth and bottom of the space are made parallel to each other, and also to the pitch-line between them, as shown in Fig. 2. To lay out this gear, take the diameter of the smallest end required and lay out the pitch-circle P P, Fig. 1. Upon this, when developed or projected upon a plane at right angles to the face of the tooth, lay out the teeth and spaces as for a spur-gear—that is, for a gear of one-inch pitch lay out the teeth on the small ends, each one inch, and the space the same, or as near as the necessary clearance allows, and for one of two-inch pitch the tooth and space at the small end should each be two inches. It is manifest that two such circles with infinitely short faces would run together at the desired angle, as two spur-gear may be thrown to the same angle and engage properly at their point of contact. Now, if the outer side of the same spurs be increased in size, without changing their relative position, until the increased pitch-circles touch each other, and the teeth and spaces of both the gear split upon all of their center lines, T G and S G, and wedges inserted, one in each tooth and one in each space, until they come fair to the increased pitch-circle P' P' at that end, while the other ends remain on the original size, the two gear will run as bevels as perfectly as they did as spurs, and the geometric problem is solved, thus demonstrating that the conoidal form is not necessary, nor even of the slightest advantage, except as amusement for professors of geometry. In making the patterns for cast gear, this method has the advantage, first, in that the mechanic has but one angle to look for—the angle of the inclination of the pitch-surface P P' to the center line of the shaft. This is the pitch-angle of the teeth, and also the angle for bottom of space and top of tooth; second, the pattern-maker may make a templet of the exact contour of the flank of his tooth from pitch-circle out, and another of the flank of the space from pitch-circle in; and these two templets shall fit the whole length of every tooth or space that can be called for of that pitch from the rack or spur to the crown-wheel, and enables him to work with great rapidity, ease, and accuracy. In cut gear the same advantage of having but one angle to compute obtains, and the blank having been fixed upon the arbor in the ordinary manner, the male or space cutter set to cut to one side of the center of the arbor, finishing the flank of one side of the space, as $S^2$ $S^2$, then a cut is taken with the cutter set over to cut to the other side of the arbor or gear center, and at the same time the gear shifted, so that the cutter runs out in the same cut as before at the inner end. This cuts the other side, as $S^3$ $S^3$, and finishes the space. Then the female or tooth cutter is treated in the same way; set to one side of center, it finishes one flank of each tooth, as $T^2$ $T^2$; and then the gear and cutter are shifted to the other side of the center and the other flank of the tooth, as T³ T³, finished. These gear will run as fine and smooth, and as perfect in all their working-surfaces, as regards pressure, contact, wear, and angular velocity, as spurs finished with the same engine and cutter; nor is this an expensive method as compared with the average cut gear of the shops.

Note, the cutters spoken of above are of the rotary description, and the work may be done in any ordinary gear-cutting engine; or the cutters may be such as are used in the planer for gear where a planed tooth is preferred. The shifting of the positions and the resulting tooth are the same in either case; also the contour of the tooth may be of any form as desired.

In these gear the pitch-lines of the smaller and larger ends are circles described upon an imaginary cone whose apex is coincident with the point of intersection of the shaft center lines, as in ordinary bevels; but the top or faces of the teeth are in the frustum of a cone whose surface is parallel to the cone of the pitch, as shown in Figs. 2 and 4, and whose apex is in its shaft center line, beyond the apex of the pitch-cone, while the bottoms of the spaces between the teeth are in the frustum of a cone whose surface is parallel to the cone of the pitch, and whose apex is within said cone.

Note, that the cone of the faces of the teeth of one gear intersects the center line of the shaft of the engaging wheel at the point where the cone of the bottoms of the spaces between the teeth of said wheel has its apex, and vice versa, as shown in Fig. 4. These teeth should not be carried nearer the apices of their cones than the pitch-circles P P, described as agreeing with the standard pitch, for the reason that such teeth would be too thin to run and too weak in their proportions; but these teeth may be extended the other way, or from the pitch-circle P P. The frustum of the cone or length of the faces of the teeth may be produced toward the base of the cone P' P' indefinitely, or as far as the mechanic may judge necessary for strength or beauty, and in respect to their strength the perfect fit and working of these teeth justifies the making of these gear with much less face in proportion to the labor to be performed by them than with the conoidal style of tooth, giving equal strength with less weight of material.

It will be seen that in these gear the teeth stand properly each upon its own center line T T and the spaces upon their own center lines S S, as required for perfect work; also, in especial cases a gear may be made as described above, and used as spur, bevel, crown, or even internal gear, at pleasure, working true and accurate and perfectly as either one; or two gear of this description may be run together at various angles, yet run smooth and true, even while making the change of position.

Having thus described the nature and uses of my invention, that which I claim, and desire to secure by Letters Patent, is—

1. In bevel-gear, a tooth having its converging sides formed from the pitch-line outward, of the same curve and same width of curve its entire length, making the top of the tooth parallel to the conical pitch-line, substantially as described.

2. In bevel-gears, a space or spaces for a tooth or teeth of another wheel to work in, bounded by converging sides formed from the pitch-line to the base of the tooth, of the same curve and same width of curve, making the bottom of the space parallel to the conical pitch-line, substantially as above set forth.

3. The bevel-gear described, having its teeth made of full pitch size and curves, as described, at the small end, the large end made from that end by increasing the distance apart of the sides of the teeth and spaces, constructed and operating substantially as and for the purposes set forth.

ALOHA VIVARTTAS.

Witnesses:
EDWARD HUGHES,
AUGUSTUS BOTTGER.